United States Patent
Wernersson et al.

(10) Patent No.: US 8,818,097 B2
(45) Date of Patent: Aug. 26, 2014

(54) PORTABLE ELECTRONIC AND METHOD OF PROCESSING A SERIES OF FRAMES

(75) Inventors: Mats Wernersson, Helsingborg (SE); Henrik Heringslack, Lomma (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 67 days.

(21) Appl. No.: 13/555,443

(22) Filed: Jul. 23, 2012

(65) Prior Publication Data

US 2013/0051673 A1    Feb. 28, 2013

Related U.S. Application Data

(60) Provisional application No. 61/526,801, filed on Aug. 24, 2011.

(30) Foreign Application Priority Data

Aug. 26, 2011    (EP) .................................... 11006991

(51) Int. Cl.
*G06K 9/00*    (2006.01)

(52) U.S. Cl.
USPC ........................................................ 382/173

(58) Field of Classification Search
CPC ....... G06K 9/00; G06K 9/20; G06K 9/00241; G06K 9/00577; G06K 9/6253; G06T 3/4038; G06T 7/0024; G06T 7/0075; G06T 9/00; G06T 13/80; G06T 15/10; G06T 2207/10016; G06T 2207/10021; G06T 2207/10028; H04N 1/00307; H04N 1/32101; H04N 5/23238; H04N 13/0014; H04N 13/0018; H04N 13/0022; H04N 13/0048; H04N 13/0055; H04N 13/0059; H04N 13/0081; H04N 13/02; H04N 13/025; H04N 13/026; H04N 13/0239; H04N 13/0271; H04N 13/0275; H04N 13/0282; H04N 13/0438; H04N 13/045; H04N 13/0456; H04N 19/00387; H04N 19/00393; H04N 19/004; H04N 19/00418; H04N 19/00587; H04N 19/00769; H04N 21/2365; H04N 21/4347; H04N 21/435; H04N 21/85406; H04N 2201/3278
See application file for complete search history.

(56) References Cited

U.S. PATENT DOCUMENTS

| | | | | |
|---|---|---|---|---|
| 8,184,196 | B2 * | 5/2012 | Forutanpour | 348/345 |
| 8,274,552 | B2 * | 9/2012 | Dahi et al. | 348/47 |
| 8,401,242 | B2 * | 3/2013 | Newcombe et al. | 382/107 |

(Continued)

OTHER PUBLICATIONS

Extended European search report and Written Opinion, corresponding to EP 11 00 6991, date of completion of the search Oct. 27, 2011.

(Continued)

*Primary Examiner* — Jose Couso
(74) *Attorney, Agent, or Firm* — Renner, Otto, Boisselle & Sklar, LLP.

(57) ABSTRACT

A portable electronic equipment comprises an image sensor configured to capture a series of frames in a time-sequential manner and a processing device coupled to the image sensor and configured to process the series of frames. The processing device is configured to perform an image segmentation for respectively each frame of at least a subset of the series, to respectively identify a section of the frame representing a given object. The image segmentation is respectively performed based on a depth map for the respective frame. The identified sections are superimposed to generate a sequence image.

15 Claims, 6 Drawing Sheets

(56) References Cited

U.S. PATENT DOCUMENTS

| | | | |
|---|---|---|---|
| 8,477,232 B2* | 7/2013 | Forutanpour | 348/345 |
| 8,558,832 B1* | 10/2013 | Cook et al. | 345/422 |
| 2006/0193509 A1 | 8/2006 | Criminisi et al. | |
| 2010/0039447 A1 | 2/2010 | Nakao | |

OTHER PUBLICATIONS

Om Malik: "Startup Charts the Future of Camera Phones, Ends Megapixel Myth", Feb. 9, 2011, XP002662331, retrieved from the Internet: URL:http://gigaom.com/2011102/09/pelican-imaging/ the whole document [retrieved on Oct. 27, 2011] *the whole document*.

Luciano Godoy Fagundes et al: "Development of Computer Graphics and Digital Image Processing Applications on the iPhone", Graphics, Patterns and Images Tutorials (SIBGRAPHI-T), 2010 23rd SIBGRAPHI Conference on, IEEE, Aug. 30, 2010, pp. 34-45, XP031943901, DOI: 10.1109/SIBGRAPI-T.2010.11 ISBN: 978-1-4244-8421-8 *the whole document*.

* cited by examiner

PORTABLE ELECTRONIC AND METHOD OF PROCESSING A SERIES OF FRAMES

FIELD OF THE INVENTION

The invention relates to a portable electronic equipment and to a method of processing a series of frames captures by an image sensor. The invention relates in particular to such an equipment and method for use in processing data corresponding to a series of frames captured by an image sensor of the portable electronic equipment in a time-sequential manner.

BACKGROUND OF THE INVENTION

A wide variety of portable electronic devices nowadays is provided with components for capturing image data. Examples for such electronic devices include portable communication devices which may include a camera. For illustration, modern mobile telephones or personal digital assistants may be equipped with a camera. With increasing performance of the image capturing components of such devices, it becomes increasingly desirable to perform additional image processing on the captured images.

Owing to the computational complexity of some image processing functions, one approach to address the above need of providing additional image processing features is to interface the portable electronic equipment with a computer. The computer may execute dedicated software for processing images captured by the portable electronic equipment. Because captured images must first be transferred to the computer for further processing, this approach may be inconvenient for a user.

Another approach is to implement additional image processing functions in the portable electronic device. For illustration, functions for forming composite images may be provided in the portable electronic device. Such functions may include steps such as computing a difference image of a first image having an object of interest positioned in front of a background and of a second image only showing the background, to thereby identify the outline of the object of interest. While such operations require only basic image processing functions, such as computing difference images, the dedicated user which are required to determine the object outline may be inconvenient. Also, techniques which require a background to remain essentially the same while successive exposures are being recorded may be of limited value to a wide variety of scenarios where the background is not stationary, as is the case when at least part of the background shows moving objects.

SUMMARY OF THE INVENTION

Accordingly, there is a continued need in the art for a portable electronic equipment and for a method which address some of the above shortcomings. In particular, there is a continued need in the art for a portable electronic equipment and for a method which allows a series of frames captured by the portable electronic equipment to be processed without requiring the frames to be transferred to an external computer. There is also a continued need in the art for portable electronic equipment and for a method which is configured to form composite images from a series of images, without requiring a background to remain stationary while the series of frames is being captured.

According to an aspect, a portable electronic equipment is provided. The portable electronic equipment comprises an image sensor and a processing device. The image sensor is configured to capture a series of frames in a time-sequential manner. The processing device is coupled to the image sensor and is configured to process the series of frames. The processing device is configured to perform an image segmentation for respectively each frame of at least a subset of the series, in order to respectively identify a section of the frame which represents a pre-determined object. The processing device respectively performs the image segmentation based on a depth map for the respective frame. The processing device is configured to superimpose the identified sections to generate a sequence image.

The portable electronic equipment provides an image processing feature which allows a sequence image to be formed from a series of frames. Thereby, a sequence image may be generated which shows an object movement in a stroboscopic manner. The series of frames may, for example, be captured with a pre-determined repetition rate, such as in a continuous exposure mode. By using depth maps for the frames in the image segmentation, a distance-selective sequence image may be generated. An object which moves approximately at a distance relative to the portable electronic equipment may respectively be identified in plural frames, using the depth maps, and a sequence image showing the different object positions in one image may be generated.

The processing device may be configured to establish a distance between the given object and the portable electronic equipment using a depth map for a given frame of the series. The processing device may be configured to identify the section representing the given object in another frame of the series based on both the established distance and the depth map for the other frame. This allows the distance information to be used when generating the sequence image, so that an object may be tracked through plural frames using the depth maps.

The processing device may be configured to determine whether the pixels of the depth map for the other frame correspond to distances which lie within a distance range, which distance range is determined as a function of the established distance. Thereby, object tracking through plural frames may be facilitated, and variations in the object distance from the portable electronic equipment which may occur while the series is being shot may be accounted for.

The processing device may be configured to identify, for respectively each frame of at least the subset, the section representing the given object such that a distance between the given object and the portable electronic equipment as specified by the depth maps corresponds to the established distance. This allows a distance-selective sequence image to be generated, where an object moving at the established distance is shown in a stroboscopic manner.

The distance between the given object and the portable electronic equipment may correspond to a distance of a focal plane from the portable electronic equipment.

When an image sensor is used which allows digital focusing or digital re-focusing to be performed, the position of the focal plane may be set equal to the established distance and the frames may be re-computed based on this position of the focal plane, prior to forming the sequence image.

The portable electronic equipment may further comprise an input interface configured to receive a user input indicating the given object in the given frame. The processing device may be coupled to the input interface and may be configured to establish the distance between the given object and the portable electronic equipment as a function of the user input. If plural objects can be identified, based on the depth map for the given frame, the input interface allows the user to indicate for which one of the different objects the sequence image is to be generated, showing the movement of the object selected by the user. The input device may include a touch-sensitive or proximity-sensing display.

The processing device may be configured to superimpose the identified sections as layers onto one of the frames to generate the sequence image. The processing device may be configured to superimpose the identified sections as layers onto a background image which may be different from each one of the frames of the sequence.

The portable electronic equipment may further comprise an optical output device. The processing device may be coupled to the optical output device and may be configured to control the optical output device to output the generated sequence image.

The image sensor may include a plurality of image sensor sections, each of the image sensor sections being respectively configured to capture an image. Each one of the image sensor sections may have a dedicated focusing optics. The plural image sensor sections may respectively be provided on separate charge-coupled device (CCD) sensor or a complementary metal oxide semiconductor (CMOS) sensor. The plural image sensor sections may be an array camera. Plural image sensor sections may be combined on one CCD or CMOS sensor. Digital refocusing or computation of depth maps can be performed using outputs of the plural image sensor sections.

The processing device may be configured to process, for each frame of at least the subset, images captured by the plurality of image sensor sections to compute the respective frame and to compute the depth map for the respective frame.

The image sensor and processing device may be mounted within a housing of the portable electronic equipment.

According to another aspect, a method of processing a series of frames captured by an image sensor of a portable electronic equipment is provided. In the method, for respectively each frame of at least a subset of the series, a section of the frame is identified, the section representing a given object. Image segmentation is respectively performed based on a depth map for the respective frame to identify the section. The identified sections are superimposed to generate a sequence image.

A distance between the given object and the portable electronic equipment may be established using a depth map for a given frame of the series. The established distance may be used when identifying the section representing the given object in another frame of the series, based on both the established distance and the depth map for the other frame. Thereby, information from plural depth maps may be combined to identify the section in the other frame.

Pixels of the depth map for the other frame may be compared to the established distance to identify the section representing the given object in the other frame.

The method may comprise determining whether pixels of the depth map for the other frame correspond to distances which lie within a distance range, the distance range being determined as a function of the established distance.

For plural frames of the series, the section representing the given object may respectively be identified such that a distance between the given object and the portable electronic equipment corresponds to the established distance. The established distance may be equal to a distance between a focal plane of the image sensor and the portable electronic equipment. Digital ref-focusing may be performed to set the distance between the focal plane of the image sensor and the digital electronic equipment equal to the established distance.

The portable electronic equipment may comprise an input interface configured to receive a user input indicating the given object in the given frame. The distance between the object and the portable electronic equipment may be established in response to the user input.

The identified sections may be superimposed as layers onto one of the frames to generate the sequence image.

The method may comprise outputting the generated sequence image over an optical output device of the portable electronic equipment.

The method may comprise capturing the series of frames by an image sensor of the portable electronic equipment.

The image sensor may include a plurality of image sensor sections, each of the image sensor sections being respectively configured to capture an image. The series of frames and the depth maps for the frames may be computed from the output signals of the plural image sensor sections.

The method may be performed by the portable electronic equipment of any one aspect or embodiment.

According to yet another embodiment, there is provided a non-transitory storage medium storing instruction code which, when executed by a processor of a portable electronic equipment, directs the portable electronic equipment to perform the method of any one aspect or embodiment.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF THE DRAWINGS

The foregoing and additional features and advantages of the invention will become apparent from the following detailed description when read in conjunction with the accompanying drawings, in which like reference numerals refer to like elements.

DETAILED DESCRIPTION OF EMBODIMENTS OF THE INVENTION

Figure 1:
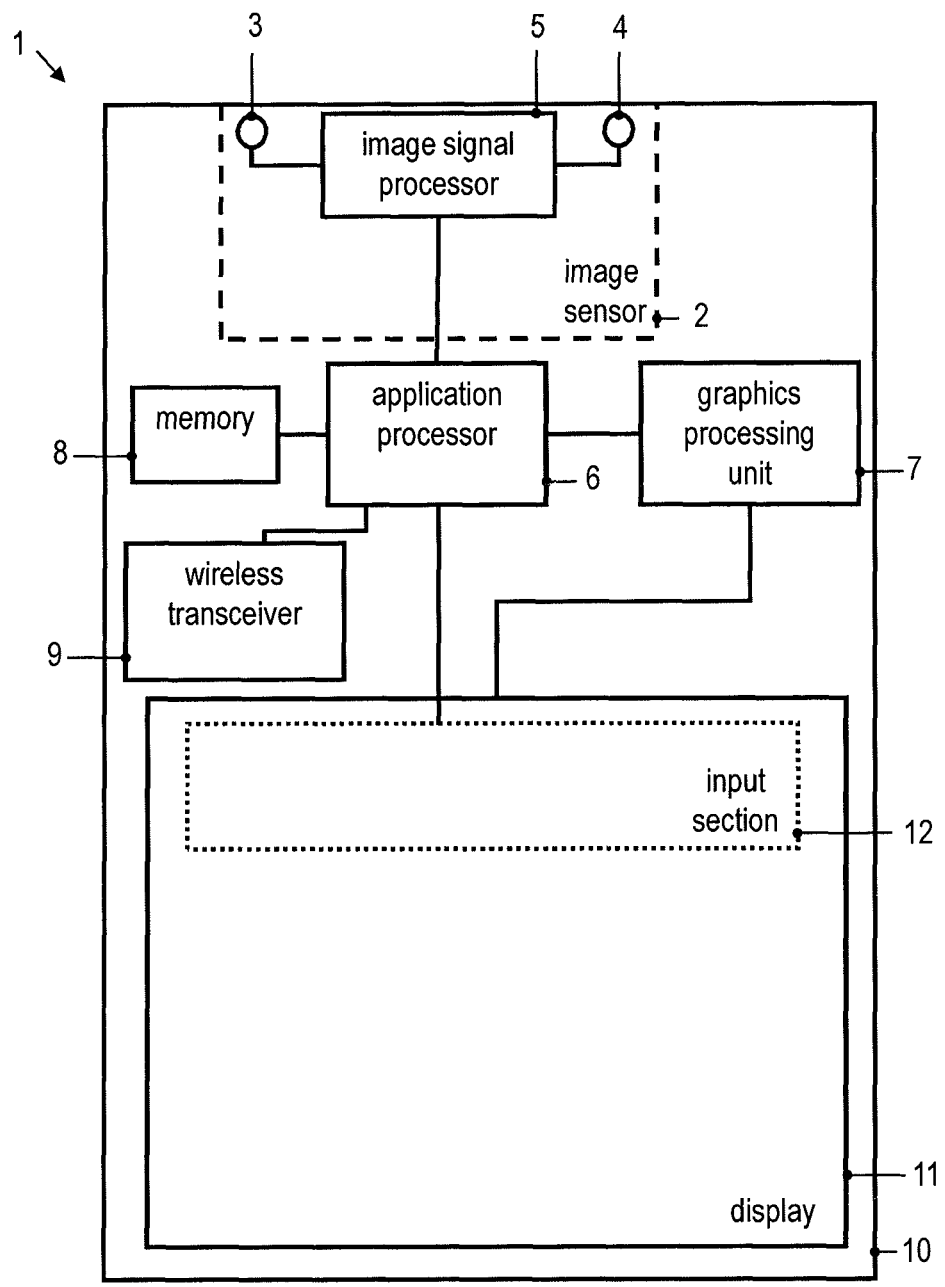
FIG. 1 is a schematic representation of a portable electronic equipment of an embodiment.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations, and elements illustrated in the drawings are not necessarily shown to scale. Rather, the various elements are represented such that their function and general purpose become apparent to a person skilled in the art. Any connection or coupling between functional blocks, devices, components or other physical or functional units shown in the drawings or described herein may also be implemented by an indirect connection or coupling. Functional blocks may be implemented in hardware, firmware, software or a combination thereof.

The features of the various embodiments may be combined with each other, unless specifically noted otherwise.

A portable electronic equipment and methods of processing a series of frames captured by an image sensor of the portable electronic equipment will be described. The portable electronic equipment has an image sensor configured to capture a series of images. The series of images may be a series of images captured at a given rate when a continuous photo mode is activated, without being limited to such an exposure mode. The portable electronic equipment uses depth maps for the frames of the series to form a composite image, which shows an object moving at a distance from the portable electronic equipment at various locations at which the object is positioned while moving relative to the portable electronic equipment. According to conventional terminology in the art, the term "depth map" refers to data which provides spatially resolved distance information on distances of objects positioned in a field of view of an image sensor. The depth map provides information on distances with a lateral resolution.

FIG. 1 is a schematic block diagram representation of a portable electronic equipment 1 according to an embodiment. The portable electronic equipment 1 includes an image sensor 2 and a processing unit coupled to the image sensor 2. The processing unit may be one processor or may include plural processors, such as an application processor 6 and a graphics processing unit 7. The processing unit may process a series of frames captured by the image sensor 2 in a continuous photo exposure or in another exposure mode in which the image sensor 2 captures a series of frames in a time-sequential manner.

The portable electronic equipment 1 may further comprise a memory 8 storing instruction code for the application processor 6. A wireless transceiver 9 may be coupled to the application processor. The wireless transceiver 9 may be configured for wireless communication under a wireless communication standard, such as GSM, 3GPP, UMTS, LTE, WLAN, or other communication standards. The application processor 6 may control the wireless transceiver 9 so as to enable wireless voice and/or data communication. The portable electronic equipment further comprises a display 11 and an input section 12 allowing a user to input data. The input section 12 may be integrated with the display 11 so as to form a combined input/output interface. The input section 12 may be constituted by touch-sensitive or proximity sensing components integrated into the display 11. The graphics processing unit 7 may be coupled to the display 11 to control outputting of graphics over the display 11. The graphics processing unit 7 may be specifically configured to perform image processing functions.

The image sensor 2 may include plural image sensor sections 3, 4. The plural image sensor sections 3, 4 may be offset from each other. Each one of the plural image sensor sections 3, 4 may have its own optical components, such as a focusing optics provided dedicatedly for the respective image sensor section 3, 4. Each one of the plural image sensor sections 3, 4 may respectively be configured to generate image data representing an optical image. The image sensor sections 3, 4 may respectively include CCD sensors, CMOS sensors or other suitable electro-optical components. The image sensor sections 3, 4 may be formed on a common CCD or CMOS chip, e.g. so as to constitute an array camera. The plural image sensor sections 3, 4 may have an overlapping field of view. The fields of view of the plural image sensor sections 3, 4 may be essentially identical.

An image signal processor 5 may be provided. The image signal processor 5 may read image data captured by the image sensor sections 3, 4 and may pre-process this data before providing it to the application processor 6. The image signal processor 5 may perform control functions such as retrieving charge value integrated in pixels of an electro-optical component of the image sensor sections 3, 4 at certain times, re-setting the image sensor sections 3, 4 for capturing another frame, or similar.

The image sensor 2 of the portable electronic equipment 1 is configured capture a series of frames. An exposure mode in which a series of frames is captured may be activated by a dedicated user input. For illustration, if a continuous photo mode is activated, the image sensor 2 may capture frames at a given rate, or at a given time interval between successive frame exposures. Capturing frames may be continued while a button on the housing of the portable electronic equipment is in a depressed state. A continuous photo mode is but an example of an exposure mode in which a series of frames is captured by the image sensor 2 in a time-sequential manner. The application processor 6 may control the image sensor 2 in dependence on the exposure mode which has been set by a user or, in the absence of a user setting, which corresponds to a default mode.

The portable electronic equipment 1 is configured such that a sequence image is generated from a series of frames captured by the image sensor 2. The sequence image shows at least one given object during plural states of its movement relative to the portable electronic equipment 1, thereby generating a stroboscopic representation for the object movement. The portable electronic equipment 1 may use depth maps for plural frames of the series to identify sections of the respective frame which correspond to the given object. Image segmentation may respectively be performed using the depth map for the respective frame. The portable electronic equipment 1 may be configured such that the processing unit computes the depth map for the various frames, based on the data captured by the different image sensor sections.

The various components of the portable electronic equipment 1, including the processing device and the image sensor 2, may be integrated in a housing 10.

The operation of the portable electronic equipment 1 will be described in more detail with reference to FIGS. 2-6.

Figure 2:
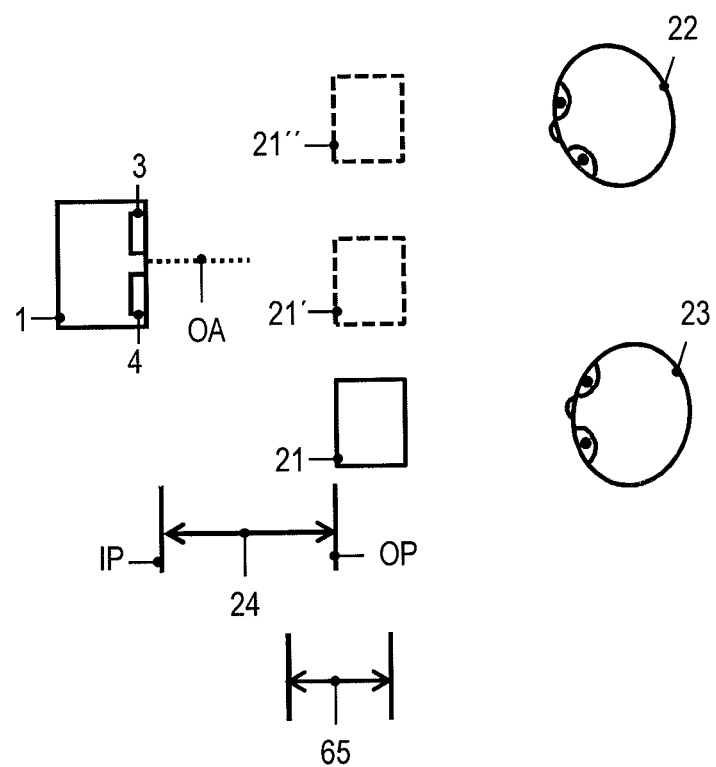
FIG. 2 is a schematic representation illustrating operation of the portable electronic equipment.

FIG. 2 is a top view illustrating the portable electronic equipment 1. The image sensor 2 of the portable electronic equipment 1 captures a series of frames of a scene in which plural objects 21-23 are arranged. One of the objects, such as object 21, may be located at a distance 24 from the portable electronic equipment 1. Other objects, such as objects 22, 23, may be located at another distance from the portable electronic equipment 1.

When an exposure mode such as a continuous photo mode is activated, the image sensor of the portable electronic equipment captures a series of frames in a time-sequential manner. The different frames of the series may be captured with a given rate, i.e., with a given time interval between successive frames. One or several of the objects 21-23 may move relative to the portable electronic equipment 1 while the series of frames is being captured. For illustration, the object 21 may be located at the position shown with solid lines in FIG. 2 when a first frame is captured, but may move to the positions indicated with broken lines at 21' and 21" when successive frames are captured at times 1·Tr and 2·Tr, respectively, where Tr denotes the time interval at which successive frames of the sequence are captured.

For each one of the captured frames, the portable electronic equipment 1 may compute a depth map. The depth map may be computed by the application processor 6, by the image signal processor 5 or by the graphics processing unit 7. The graphics processing unit 7 may be configured to perform the various image processing functions which will be described with reference to FIGS. 3-6 below. The depth map provides information on distances of objects positioned in the field of view of the image sensor 2. The depth map provides this distance information with a lateral resolution, thereby specifying where the object closest to the image sensor is respectively positioned for plural viewing directions.

The depth map may be computed by comparing the images captured by the different image sensor sections 3 and 4, respectively. The principle of parallax may be used to compute the distance of the plane OP in which an object point is located from the plane IP in which the image sensor sections 3, 4 lie, or from another reference plane of the portable electronic equipment. Edge detection schemes or other image processing may be used to identify corresponding objects in the images captures by the different image sensor sections 3, 4, and to then compute the distance of the object from the portable electronic equipment 1 based on the principle of parallax.

The images captured by the different image sensor sections 3, 4 at a given time may not only be combined to compute the depth map, but also to compute the frame. An enhanced resolution and/or digital refocusing may be attained by combining the images captured by the different image sensor sections 3, 4 to one frame.

Figure 3:
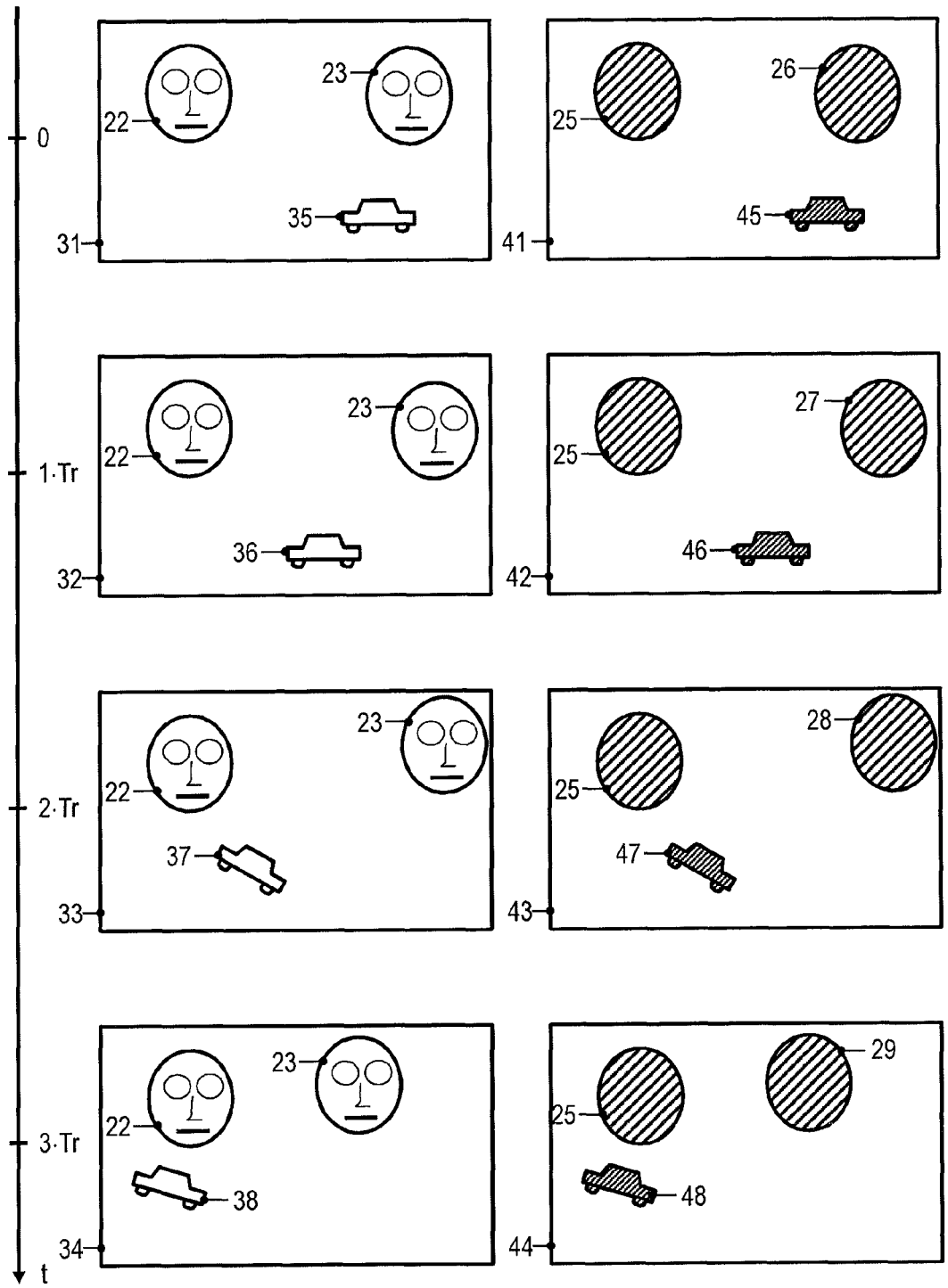
FIG. 3 is a schematic illustration of a series of image frames captured by the portable electronic equipment and associated depth maps.

FIG. 3 illustrates frames 31-34 captured by the portable electronic equipment 1. Each one of the frames 31-34 may have undergone processing by one or several processors 5-7 of the portable electronic equipment 1. For illustration, frame 31 may be computed from an image captured by the image sensor section 3 and another image captured by another image sensor section 4 of the image sensor 2 at a time t=0. Frame 32 may be computed from an image captured by the image sensor section 3 and another image captured by another image sensor section 4 of the image sensor 2 at a time t=Tr. Similarly, other frames 33, 34 of the series of frames may respectively be computed from images captured by plural image sensor sections 3, 4 of the image sensor 2.

A depth map is associated with each one of the frames 31-34. A depth map 41 for frame 31 may be computed from the image captured by the image sensor section 3 and another image captured by another image sensor section 4 of the image sensor 2 at the time t=0. A depth map 42 for frame 32 may be computed from the image captured by the image sensor section 3 and another image captured by another image sensor section 4 of the image sensor 2 at the time t=Tr. Similarly, depth maps 43, 44 for other frames 33, 34 of the series may be computed by the portable electronic equipment.

Pixel values of the depth map respectively indicate distances, thereby providing three-dimensional (3D) information. Different distances are schematically illustrated by different hatch line densities in the depth maps 41-44. In the depth maps 41-44, un-hatched sections correspond to infinity distance, hatched sections correspond to finite distances. A greater hatch line spacing (such as in section 25 in depth map 41) corresponds to a greater distance, and a smaller hatch line spacing (such as in section 45 in depth map 41) corresponds to a smaller distance.

By using the depth maps, distances of the various objects shown in the associated frame may be readily determined. Moreover, the distance information included in the depth map may be used in image segmentation of the associated frame.

Referring to frame 31 and associated depth map 41, the frame 31 shows objects 22 and 23. Object 21, e.g. a toy car, is represented by a section 35 of the image frame 31. Objects 22 and 23 are located at a distance from the portable electronic equipment 1 which is greater than the distance 24 at which the object 21 is located from the portable electronic equipment 1. Correspondingly, the depth map 41 for frame 31 has a section 45 corresponding to object 21 shown in section 35 of frame 31, with the pixel values in section 45 being indicative of the distance 24. The depth map 41 for frame 31 has a section 25 corresponding to object 22 shown in frame 31, with the pixel values in section 25 being indicative of a distance which is greater than the distance 24. The depth map 41 for frame 31 has a section 26 corresponding to object 23 shown in frame 31, with the pixel values in section 26 being also indicative of a distance which is greater than the distance 24. The pronounced changes in pixel values in the depth map 41 may be used to identify the section 35 in frame 31 which corresponds to object 21.

As schematically illustrated, when the successive frames 32-34 are captured at discrete times n·Tr, the object 21 moves relative to the portable electronic equipment. The section representing the object in frames 32-34 is displaced from section 35 in frame 31 to section 36 in frame 32, on to section 37 in frame 33, and on to section 38 in frame 34. The associated depth maps mimic this displacement, indicating that the closest object is displaced from the pixels in section 45 in depth map 41 to section 46 in depth map 42 at time t=Tr, then on to section 47 in depth map 43 at time t=2·Tr, and on to section 48 in depth map 44 at time t=3·Tr. Using the position and outline of sections 45-48 in depth maps 41-44, sections 35-38 may be identified in frames 31-34.

For an object moving at a constant distance from the portable electronic equipment 1, measured along an optical axis OA of the portable electronic equipment 1, the pixel values of sections 46-48 in depth maps 42-44 are essentially the same as the pixel values of section 45 in depth map 41. A change in distance from the portable electronic equipment will lead to an associated change in the pixel values of the section representing object 21 in the depth maps 41-44, from one depth map to another depth map captured at another time.

By identifying the sections 35-38 representing the object 21 in frames 31-34 based on the associated depth maps 41-44, it is possible to selectively extract, or cut out, the pixels of the sections 35-38 for at least some of the frames and to superimpose the sections to form a sequence image. The sequence image shows the movement of object 21 in a stroboscopic manner.

For illustration, section 36 of frame 32 may be superimposed onto frame 31. The section 36 may be added to frame 31 as an image layer. Section 37 of frame 33 may be superimposed onto the thus modified frame 31, for example by adding it as yet another image layer. Section 38 of frame 33 may be superimposed onto the thus modified frame 31, for example by adding it as yet another image layer. The resulting image is the sequence image.

Figure 4:
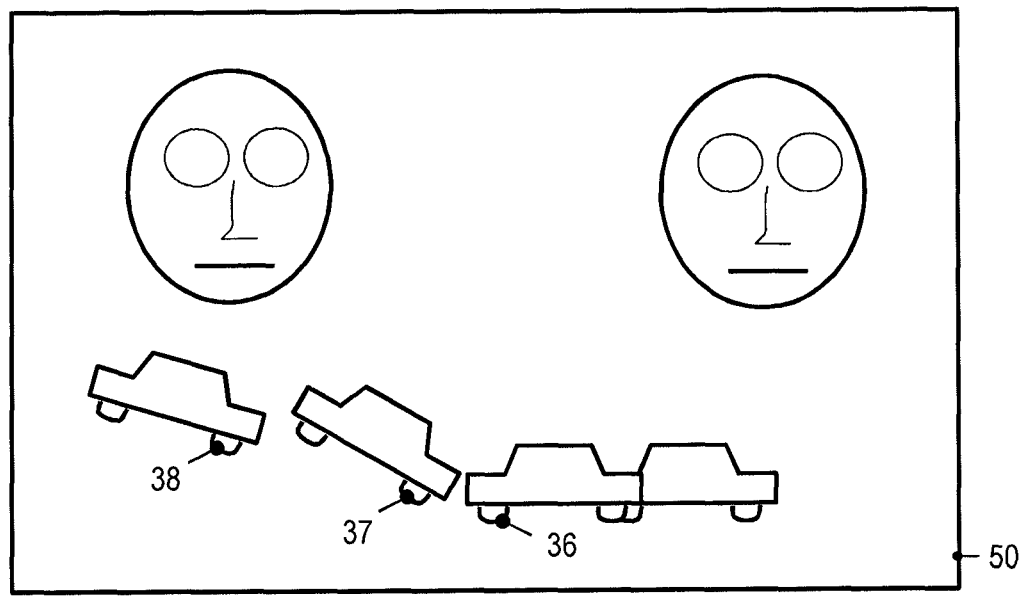
FIG. 4 is a schematic illustration of a sequence image generated by the portable electronic equipment.

FIG. 4 illustrates a resulting sequence image 50 which may be obtained in this way. The sections 36-38 taken from frames 32-34 are superimposed as layers on frame 31 to form the sequence image 50.

As schematically illustrated in FIG. 3, not only object 21, but also other objects may move relative to the portable electronic equipment. For illustration, object 23 is illustrated as being displaced while the portable electronic equipment captures the series of frames 31-34. The section of the depth map which represents the object 23 is displaced accordingly in the depth map, as indicated by sections 26-29 in depth maps 41-44. This varying background does not significantly affect the resulting sequence image. By performing image segmentation to identify sections 36-38 representing the object 21 in frames 31-34 and by selectively adding only sections 36-38 as layers to frame 31, a sequence image may be generated even when other objects move relative to the portable electronic equipment 1 while the series of frames is being captured.

Tracking of an object through various frames may be performed by comparing the depth values indicated by the depth maps for different frames. For illustration, the distance 24 of the object 21 from the portable electronic equipment 1 may be established based on the pixel values of the depth map 41 in section 45. In order to generate a sequence image showing the movement of object 21 relative to the portable electronic equipment 1. The image segmentation for the other frames 32-34 may include identifying sections of the associated depth maps 42-44 which have pixel values which are essentially identical to, or lie within a certain range around, the established distance 24. A distance range indicated at 65 in FIG. 2 may be defined, and pixel values corresponding to distances within the distance range 65 may be identified in depth maps 42-44. When the distance of the object 21 from the portable electronic equipment 1 does not change by more than a given threshold, image segmentation may then be further simplified. Only sections of the depth maps 42-44 where pixel values correspond to a distance within the distance range 65 need then be taken into account.

The object 21 for which the sequence image is to be generated may be selected automatically by comparing object distances of different objects to the distance of the focal plane of the image sensor 2 from the portable electronic equipment. The sequence image may be generated for an object which moves in the focal plane of the image sensor 2.

When the distance of the object 21 from the portable electronic equipment 1, measured along the optical axis OA, varies by more than a threshold, the distance range 65 may be defined so as to take into account this movement of the object relative to the portable electronic equipment 1. For illustration, a user may indicate the object for which he intends the sequence image to be generated both in a first frame and in a last frame of the series of frames. The distance of the object from the portable electronic equipment may be determined for the time at which the first frame was captured and for the time at which the last frame of the series has been captured. The distance range 65 may be set so as to cover the interval between these two distances.

In some cases, there may be more than one object visible in frames of the series. There may even be plural objects in the focal plane of the image sensor. In this case, the processing device of the portable electronic equipment may allow a user to select one of the plural objects.

Figure 5:
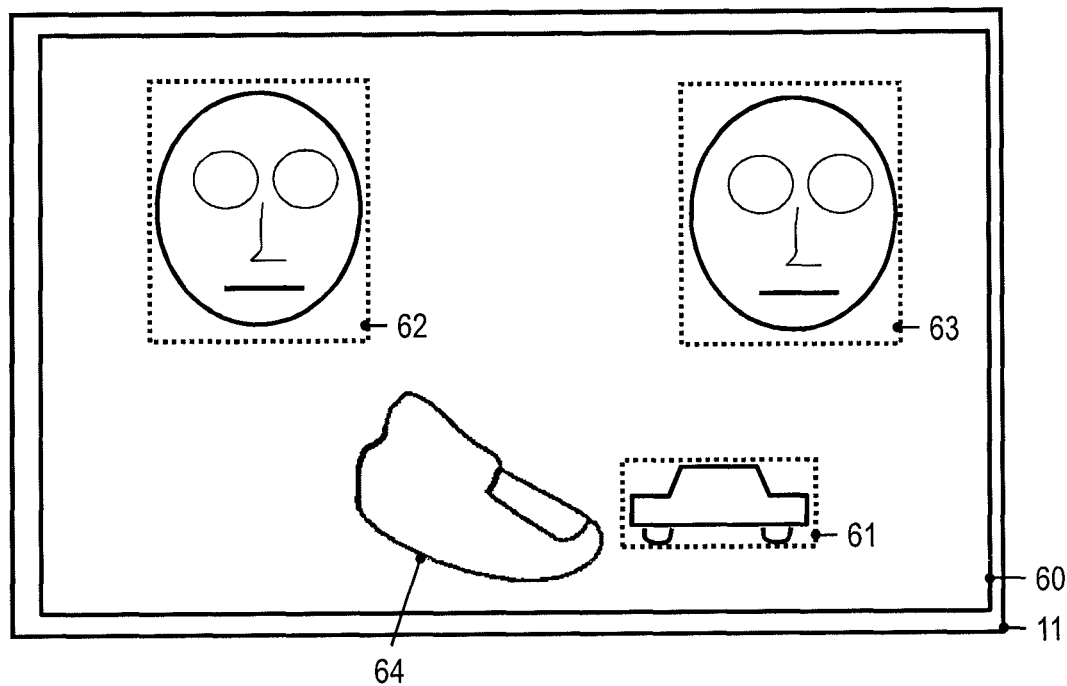
FIG. 5 is a schematic view of an input/output interface of the portable electronic equipment when an object is selected.
Figure 6:
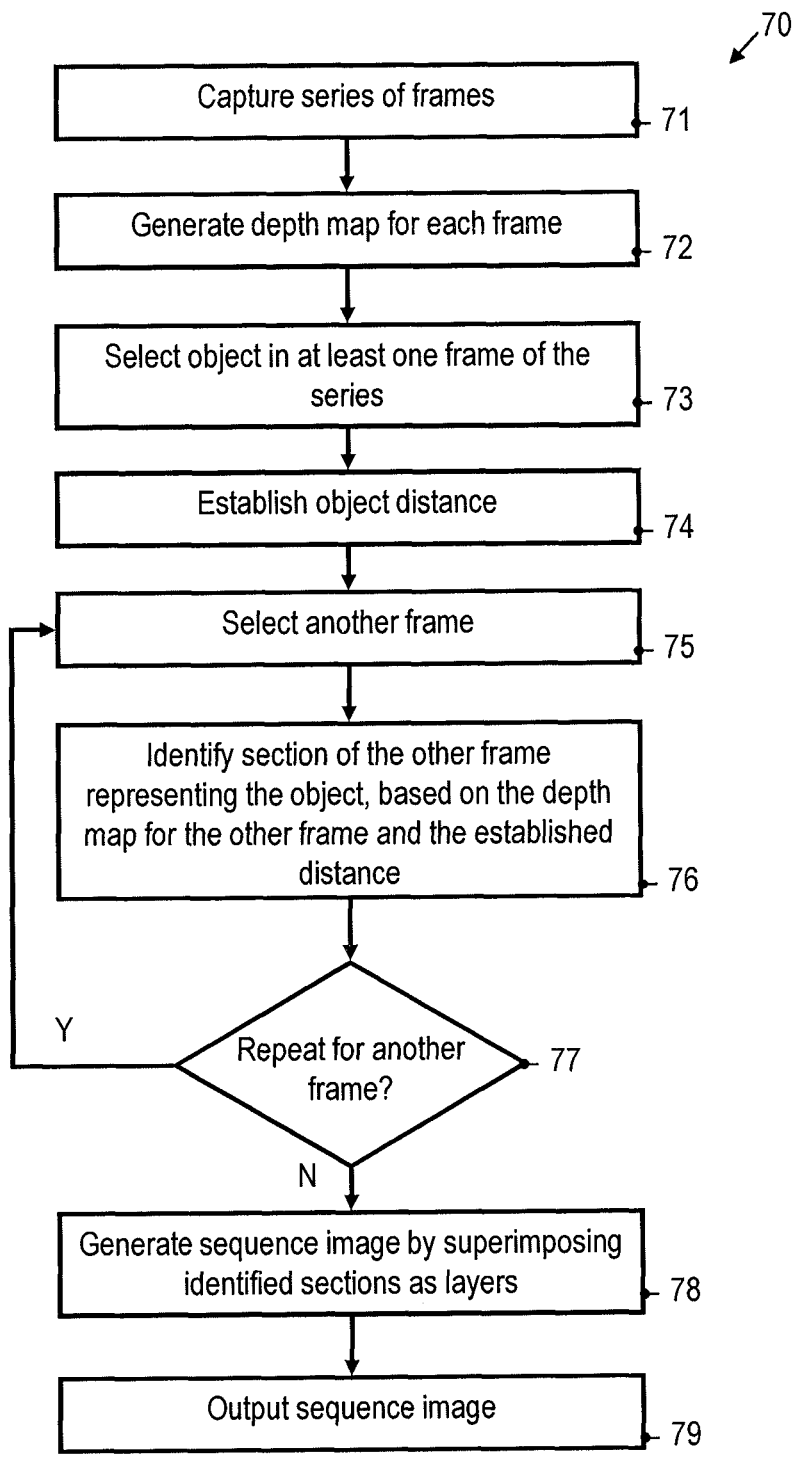
FIG. 6 is a flow chart of a method of an embodiment.

FIG. 5 illustrates a graphics 60 output on the displace 11 of the portable electronic equipment, to allow a user to select one of plural objects. The graphics 60 includes one of the captured frames. Objects identified in the frame, using the depth map for the frame, may be indicated by markings 61-63. The user may select the object for which the sequence image is to be generated by touching an area enclosed by one of the markings 61-63 with his finger 64 or by bringing his finger 64 into proximity to the marking 61-63. For illustration, by touching the area enclosed by marking 61, generation of a sequence image which shows the movement of the toy car enclosed by marking 61 may be triggered.

Figure 7:
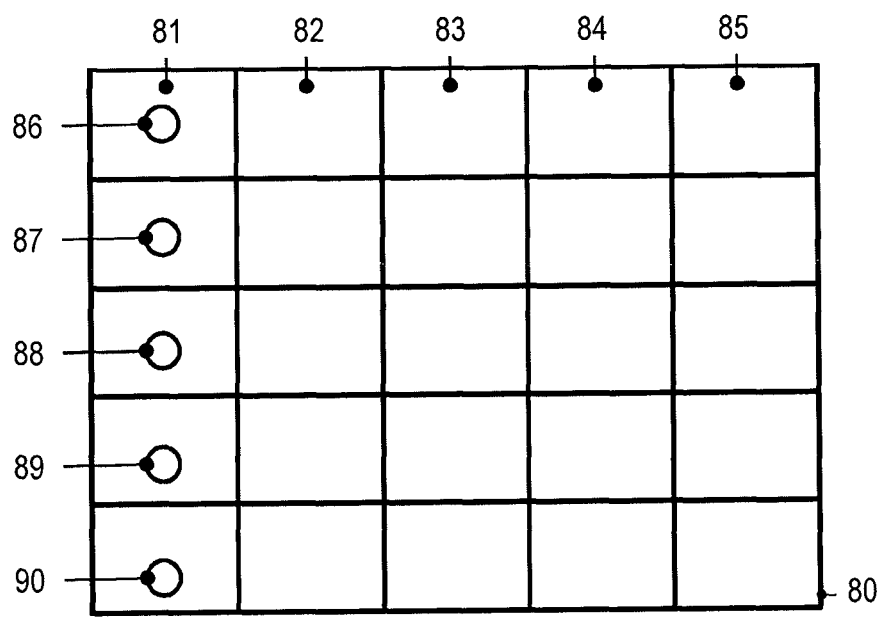
FIG. 7 is a schematic view of an image sensor comprising a plurality of image sensor sections.

FIG. 7 is a flow chart of a method of an embodiment. The method is generally indicated at 70. The method may be performed by the portable electronic equipment, as explained with reference to FIGS. 1-6.

At 71, a series of frames is captured by an image sensor of the portable electronic equipment. The series of frames may be captured when a continuous photo mode or another exposure mode is activated, which causes plural frames to be captured in a time-sequential manner.

At 72, a depth map is generated for each frame of the series. Alternatively, the depth map may be generated for each frame of a subset of the series, e.g. when the sequence image is to be formed only from the subset of the series. The depth map may respectively be generated using sensor fusion of different image sensor sections which have overlapping, or essentially identical, fields of view. The depth map may be generated based on a parallax of images captured by different image sensor sections which are offset from each other. The depth map may also be generated using an output of a dedicated distance sensor which is different from the image sensor.

At 73, an object is selected in at least one of the frames of the series. The object may be selected automatically, for example by identifying an object located in the focal plane of the image sensor. Alternatively or additionally, the object may also be selected by allowing a user to indicate for which object the sequence image is to be generated. When a user is allowed to indicate an object, at least one frame of the series may be output to the user, so that the user may select the object by touching the portion of the display where the object is shown. More than one frame of the series may be output via the display, to allow a user to specify a distance range of distances from the portable electronic equipment.

At 74, the distance of the object from the portable electronic equipment is established based on a depth map.

Steps 75-77 are then performed for plural other frames of the series. For illustration, referring to FIG. 3, when the user indicates the object for which the sequence image is to be generated in frame 31, steps 75-77 may be performed for frames 32-34.

At 75, another frame of the series is selected.

At 76, a section of the other frame is identified which represents the object selected at 73. The section is identified based on the depth map for the other frame and the distance established at 74. Identifying the section of the other frame may be implemented in various ways. For illustration, identifying the section of the other frame may include identifying pixels of the depth map for this other frame which correspond to distances which do not differ by more than a threshold from the distance established at 74. Identifying the section of the other frame may include identifying pixels of the depth map for this other frame which correspond to distances which are essentially the same as the distance established at 74. In the latter case, a sequence image is generated for an object which moves in a plane at a given distance from the portable electronic equipment.

At 77, it is determined whether steps 75-77 are to be repeated for yet another frame. The determining at 77 may be performed based on whether steps 75 and 76 have already been performed for all frames of the series. The determining at 77 may be performed based on whether steps 75 and 76 have already been performed for a subset of the frames of the series which has previously been selected by a user.

If steps 75 and 76 are to be repeated for yet another frame of the series, the method returns to 75. Otherwise, the method proceeds to 78.

At 78, a sequence image is generated based on the sections identified at 76. The sequence image may be generated by adding the sections identified at 76 as layers to one of the frames of the series. The sequence image may be generated by adding the sections identified at 76 as layers to a background image which is not included in the series of frames. Thereby, the sequence showing the motion of the object in a stroboscopic manner may be superimposed on an arbitrary background image.

At 79, the sequence image may be output on the display of the portable electronic equipment.

Additional steps may be included in the method 70. For illustration, digital re-focusing may be performed for the plural image frames based on the distance established at 74. Thereby, the focal plane of the image sensor is positioned such that the object which is of interest to the user is located in the focal plane. Digital re-focusing may be performed using the images captured by plural image sensor sections which are off-set from each other.

A variety of modifications and alterations may be implemented in other embodiments. For illustration, various implementations of image sensors may be used.

FIG. 7 illustrates an image sensor 80 which is formed as a camera array. The camera array includes plural image sensor sections 81-85. The image sensor 80 is configured as a five by five camera array, such that there is a total of twenty-five image sensor sections. Each one of the image sensor sections may operate as a camera. Each one of the image sensor sections may have its own focusing optics, such as a focusing lens. Focusing optics 86-90 are shown for a subset of the image sensor sections, it being understood that each one of the image sensor sections may have such dedicated focusing optics.

The fields of view of the image sensor sections 81-85 may overlap. The fields of view of the image sensor sections 81-85 may essentially coincide. Each one of the image sensor sections 81-85 may have a resolution which is less than that of a camera having the same lateral dimensions as image sensor 80. Computational processing may be used to increase the resolution by combining the images of the different image sensor sections 81-85. The images captured in parallel by the different image sensor sections 81-85 may be computationally combined into one frame, using super-resolution techniques. The images captured in parallel by the different image sensor sections 81-85 may be computationally processed to generate associated depth maps.

The CCD or CMOS sensors of the image sensor sections 81-85 may be combined on one CCD sensor chip or CMOS sensor chip. A compact design, in particular a design having a small height in the direction perpendicular to the drawing plane of FIG. 7, may be attained.

While portable electronic equipments and methods of processing a series of frames captured by an image sensor of the portable electronic equipment have been described with reference to the drawings, modifications and alterations may be implemented in further embodiments. For illustration rather than limitation, while exemplary implementations for image sensors have been described, other or additional sensor componentry may be used. For illustration, a dedicated sensor may be provided for capturing the depth map. Such a sensor may operate as a photonic mixer device (PMD) sensor. For further illustration, the sensor which is used to generate the depth map may, but does not need to be an optical sensor. For further illustration, the image sensor does not need to have plural different image sensor sections.

For further illustration, while a sequence image may be generated using all frames of a series, a subset of a series of captured frames may be selected for generating the series image in other embodiments. The subset may be selected in a user-defined manner. The subset may also be selected automatically, for example by performing a threshold comparison for the displacement of the object between different frames. If the shift in the position of the object is less than a threshold between successive frames, one of the frames may be omitted for generating the sequence image. In still other embodiments, depending on the total number of frames in the series, only every $n^{th}$ frame may be selected for processing, where n is an integer greater than two.

For further illustration, other processing may be used to track an object through plural frames. Edge detection may be used to detect object outlines in plural frames. Object outlines identified in different frames may be compared to each other, to ensure that the sections representing the object in different frames have comparable outlines. Edge detection schemes or other techniques may be used in addition to distance-selective segmentation.

For further illustration, while generation of a sequence image has been described in the context of one object, a sequence image may be generated for two or more objects. For illustration, the movement of all objects located in the focal plane of the image sensor may be shown in a stroboscopic manner in the generated sequence image.

For still further illustration, various configurations of the processing device of the portable electronic equipment may be implemented. The processing device may include plural processors, with one of the processors being a dedicated graphics unit processor which controls the optical output unit and additionally performs steps of methods of embodiments. The processing device may consist of only one processor in other embodiments.

Examples for portable electronic equipments which may be configured as described herein include, but are not limited to, a mobile phone, a cordless phone, a personal digital assistant (PDA), and the like.

The invention claimed is:

1. A portable electronic equipment, comprising:
   an image sensor configured to capture a series of frames in a time-sequential manner; and
   a processing device coupled to said image sensor and configured to process said series of frames, said processing device being configured to:
   perform an image segmentation for respectively each frame of at least a subset of said series, to respectively identify a section of said frame, said section representing a given object which moves in a plane at a distance from the portable electronic equipment, said image segmentation being respectively performed based on a depth map for the respective frame; and
   superimpose said identified sections to generate a sequence image which shows the given object at plural states of its movement relative to the portable electronic equipment in the plane which is located at the distance from the portable electronic equipment.

2. The portable electronic equipment of claim 1,
   wherein said processing device is configured to establish the distance between said given object and said portable electronic equipment using a depth map for a given frame of said series, and to identify said section representing said given object in another frame of said series based on both said established distance and said depth map for said other frame.

3. The portable electronic equipment of claim 2,
   wherein said processing device is configured to compare pixels of said depth map for said other frame to said established distance to identify said section representing said given object in said other frame.

4. The portable electronic equipment of claim 3,
wherein said processing device is configured to determine whether said pixels of said depth map for said other frame correspond to distances which lie within a distance range, said distance range being determined as a function of said established distance.

5. The portable electronic equipment of claim 2,
wherein said processing device is configured to identify, for respectively each frame of at least said subset, said section representing said given object such that a distance between said given object and said portable electronic equipment corresponds to said established distance.

6. The portable electronic equipment of claim 5,
wherein said distance between said given object and said portable electronic equipment corresponds to a distance of a focal plane of said image sensor from said portable electronic equipment.

7. The portable electronic equipment of claim 2, further comprising:
an input interface configured to receive a user input indicating said given object in said given frame;
wherein said processing device is coupled to said input interface and is configured to establish said distance as a function of said user input.

8. The portable electronic equipment of claim 1,
wherein said processing device is configured to superimpose said identified sections as layers onto one of said frames of said series to generate said sequence image.

9. The portable electronic equipment of claim 1, further comprising:
an optical output device;
wherein said processing device is coupled to said optical output device and is configured to control said optical output device to output said generated sequence image.

10. A portable electronic equipment, comprising:
an image sensor configured to capture a series of frames in a time-sequential manner,
wherein said image sensor includes a plurality of image sensor sections, each of said image sensor sections being respectively configured to capture an image, wherein fields of views of the plurality of image sensor sections overlap and wherein each one of the image sensor sections has its own dedicated focusing lens; and
a processing device coupled to said image sensor and configured to process said series of frames, said processing device being configured to:
perform an image segmentation for respectively each frame of at least a subset of said series, to respectively identify a section of said frame, said section representing a given object which moves in a plane at a distance from the portable electronic equipment, and
superimpose said identified sections to generate a sequence image which shows the given object at plural states of its movement relative to the portable electronic equipment in the plane which is located at the distance from the portable electronic equipment.

11. The portable electronic equipment of claim 10,
wherein said processing device is configured to process, for each frame of at least said subset, images captured by said plurality of image sensor sections to compute the respective frame and the depth map for the frame.

12. A method of processing a series of frames captured by an image sensor of a portable electronic equipment, said method comprising the following acts performed by said portable electronic equipment:
identifying, for respectively each frame of at least a subset of said series, a section of said frame, said section representing a given object which moves in a plane at a distance from the portable electronic equipment, wherein an image segmentation is respectively performed based on a depth map for the respective frame to identify said section; and
superimposing said identified sections to generate a sequence image which shows the given object at plural states of its movement relative to the portable electronic equipment in the plane which is located at the distance from the portable electronic equipment.

13. The method of claim 12,
wherein the distance between said given object and said portable electronic equipment is established using a depth map for a given frame of said series; and
wherein said identifying said section representing said given object in another frame of said series respectively comprises:
comparing pixels of said depth map for said other frame to said established distance.

14. The method of claim 13,
wherein, for respectively each frame of at least said subset, said section representing said given object is identified such that a distance between said given object and said portable electronic equipment corresponds to said established distance.

15. The method of claim 12,
performed by portable electronic equipment, comprising:
an image sensor configured to capture the series of frames in a time-sequential manner; and
a processing device coupled to said image sensor and configured to process said series of frames, said processing device being configured to:
perform the image segmentation for respectively each frame of at least the subset of said series, to respectively identify said section of said frame, said section representing said given object, said image segmentation being respectively performed based on said depth map for the respective frame; and
superimpose said identified sections to generate said sequence image.

* * * * *

UNITED STATES PATENT AND TRADEMARK OFFICE
CERTIFICATE OF CORRECTION

PATENT NO. : 8,818,097 B2
APPLICATION NO. : 13/555443
DATED : August 26, 2014
INVENTOR(S) : Mats Wernersson et al.

It is certified that error appears in the above-identified patent and that said Letters Patent is hereby corrected as shown below:

On the Title Page, Item (54) and in the Specification, column 1, line 1, Title "PORTABLE ELECTRONIC AND METHOD OF PROCESSING A SERIES OF FRAMES" should read -- "PORTABLE ELECTRONIC EQUIPMENT AND METHOD OF PROCESSING A SERIES OF FRAMES"

Signed and Sealed this
Fourth Day of August, 2015

Michelle K. Lee
*Director of the United States Patent and Trademark Office*